May 29, 1934.  O. SEVERSON  1,960,319
EXPANSION REAMER
Filed April 28, 1931
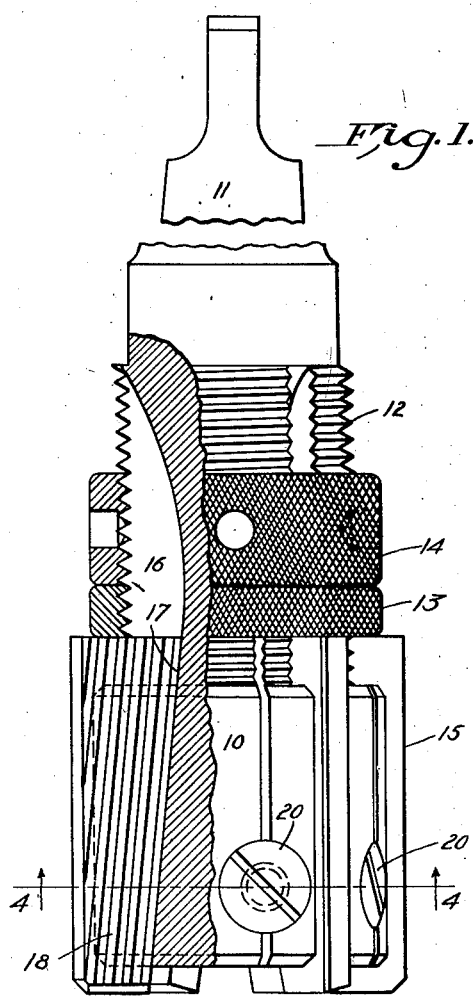
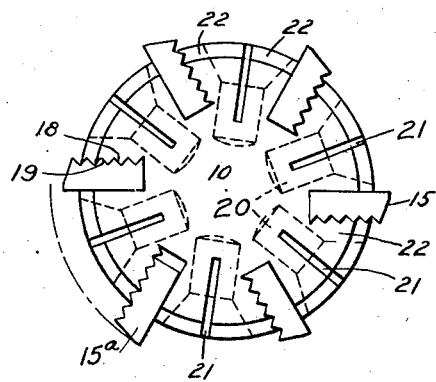
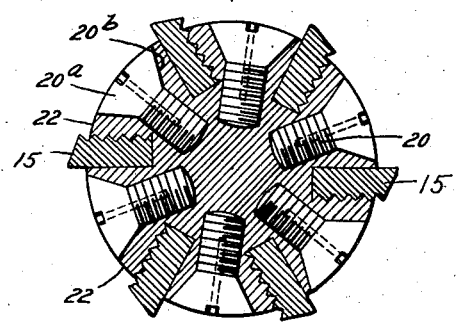
Inventor
Ole Severson
By Attorneys
Nathan, Bowman & Helfrich Patented May 29, 1934

1,960,319

UNITED STATES PATENT OFFICE 1,960,319

EXPANSION REAMER

Ole Severson, Shelton, Conn., assignor to The O. K. Tool Company, Inc., New York, N. Y., a corporation of New York Application April 28, 1931, Serial No. 533,449

4 Claims. (Cl. 77—75.5)

This invention relates to cutting tools and more particularly concerns the insertable blade type of tools, such as boring heads, reamers, etc.

It has for its primary object to provide a positive and effective means for locking the blade or blades securely in the holder in such a manner, however, that they may be easily and quickly adjusted and reground to maintain a prescribed dimension within the range of the particular tool. Expanding reamers, for example, illustrate but one form of tool to which this invention is applicable, and in this style of tool, considerable difficulty has heretofore been experienced in adjusting and locking the blades rigidly in the holder. This invention contemplates a means for insuring a positive lock for the blades while yet permitting free and easy adjustments thereof. A further concept is to design the blades, and the recesses in which they fit, in a manner as to permit major changes in sizes to be made, that is, so that a given tool may be changed from one size of cutter to a perceptibly larger or smaller size, each retaining the micrometer like adjusting features above mentioned for effecting finer variations in size.

A further object of this invention is to eliminate auxiliary locking pins, wedges, shims, etc., and to provide a single means for locking two or more blades securely within the holder, thereby reducing the number of necessary parts and increasing the rigidity of the tool head.

To carry out the objects of this invention it is proposed to arrange a holder member with one or more peripheral slots, longitudinally arranged, for the reception of suitable blades. The lower wall or bottom of each slot is formed at an angle with respect to the axis of the tool, the deeper portion being near the shank end, so as to provide an inclined seat for the blades. Lock nuts behind the blades prevent inward movement thereof as well as providing means for adjusting the blades outwardly.

So that the blades will not move radially, one wall of the slot is provided with a series of axially extending serrations which interfit similar serrations formed upon the rear face of the blade. The interlocking serrations, however, do not of themselves rigidly lock the blade to the holder and it is the purpose of this invention to provide a novel arrangement whereby two blades may be securely locked in their seats, by but a single instrumentality, in a manner whereby auxiliary wedges, pins, etc., are eliminated.

With that end in view the tool holder is provided with a second series of slots arranged intermediate the blade slots and intersecting a series of radial holes bored, tapped and countersunk therein so as to receive beveled headed screws. The more tightly the screws are driven inwardly, the more the supplemental slots are expanded and the greater will be the impinging effect upon the blade members in the adjacent apertures.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, a drawing depicting a preferred typical construction has been annexed as a part of this disclosure and, in such drawing, like characters of reference denote corresponding parts throughout all the views, of which:—

Figure 1 is an elevational view of an expansion reamer, partly in section, incorporating this invention. Fig. 2 is an end view thereof. Fig. 3 represents a central sectional view, one half of which illustrates an extended position of a blade, and the other half, a retracted position. Fig. 4 is a sectional view along line 4—4 of Fig. 1.

Referring more particularly to Fig. 1, the illustration there depicts a reaming tool incorporating this invention and which comprises essentially a body portion 10 formed integral with the tapered shank portion 11. It will be understood, however, that this invention is also applicable to other types of reamers and cutters and that the drawing and description herein represent merely but one application of this invention. Intermediate the shank and head, a threaded portion 12 is provided upon which a check nut 13 and lock nut 14 are carried for adjusting and maintaining the blades 15 in a predetermined position.

The head portion of the instant reamer is provided with a series of longitudinally arranged slots or apertures 16 in which the blades are fitted. The lower wall or bottom 17 of each of the slots inclines at an angle with respect to the axis of the tool, thereby forming an inclined passage way and seat for the blades.

The base portions of the blades are likewise inclined at an angle complemental to the angle of inclination of the bottom of the slots and when inserted and moved axially therein the outer faces or cutting edges of the blades remain parallel at all times; assuming, of course, that the tool is designed to bore or ream a cylindrical opening.

In a forming tool, for example, the contour of blades would be in accordance with the peculiarities or requirements of the work.

The front and rear faces of the blades being parallel, means must be provided for preventing radial movement thereof, therefore, interengaging means such as the serrations 18 on the blades and 19 on the walls of the slots are provided for this purpose. It will be observed that the serrations extend in a direction paralleling the bottoms of the slots and that when the blades are fitted therein they are free to move in a substantially axial direction, the opposite walls of the slots being spaced a distance affording but a sliding fit between the members.

Inward movement of the blades is checked by the adjustable lock nut 13 and 14 and as these are moved forwardly or rearwardly, the blades are likewise moved forwardly or rearwardly, thus if the check nut is advanced one revolution, the blades are moved outwardly a corresponding distance. However, by reason of the incline of the interlocking serrations, the blades will also be moved in a radial direction but only a fractional part of the outward movement. So likewise if the nuts be turned only a portion of a revolution or if a finer pitch thread be employed, exceedingly fine variations in cutter diameter may be effected very easily.

This invention proposes a novel means for securely locking the blades against axial and radial movement after they have been set, and which comprises essentially a series of wedge-like screws 20 adapted to seat in threaded apertures formed intermediate the blade slots. The cutter body member 10 has also formed therein a second series of peripheral slots 21 arranged intermediate the blade cavities and thereby forming a plurality of wing sections 22.

The clamp screws 20, which are provided with tapered head portions 20$^a$, are fitted within complementally shaped recesses 20$^b$ radially disposed in the slots 21 at a point intermediate the ends of the tool head. Thus it will be seen that as the cramp screws 20 are urged inwardly the wing sectors 22 will be moved circumferentially and tend to close the blade slots 16 and open further the intermediate slots 21. This action impinges the side walls of the blade apertures tightly against the respective cutter teeth, the greater force acting at the periphery of the cutter head adjacent that portion of the blade which receives the main shocks and stresses of the cutting operation.

In this manner the blades are securely locked in the holder, each of the screws 20, serving as the clamping medium for two adjacent blades. The collars 13 and 14 hold the blades positively against movement in the direction of the thrusts thereupon, and the cramp screws restrain the blades from moving outwardly and thus prevent the assembled cutter from running oversize. For this reason and from a practical standpoint only one cramp screw need be employed for each set of two blades and the space intervening the sets may be left solid.

The right side of Fig. 3 depicts a sectional view through a representative cutter illustrating the manner of decreasing slightly the size of the cutter merely by backing off the lock nuts 13 and 14, the dotted lines indicating the blade in its former or original position. The left side of this figure illustrates an outward adjustment of the blade to effect a slight increase in the cutter size. Exceedingly fine adjustments in cutter size may be effected by decreasing the angle of inclination of the serrations formed in the cutter body and on the blades and in this way a given fraction of a turn of the lock nuts (depending also upon the pitch of the threads) will effect a finer radial positioning of the blades.

In order to effect coarse changes in cutter diameter without undue overhang of the blades beyond the end of the holder or to compensate for the normal wear on the teeth, the blades are removed from the slots and stepped over radially one or more of the serrations and again clamped in place. The blade member 15$^a$ in Fig. 2 illustrates one that has been re-adjusted radially thereby to form a perceptibly larger cutting tool or to obtain further use of the blades after they have been worn to a size prohibiting further and safe axial adjustment thereof in the manner previously explained.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. An insertable blade reamer or like rotary cutting tool combining a body member having a head portion and a reduced shank portion, said head portion having a plurality of radially arranged peripheral blade apertures formed therein extending longitudinally of the head; elongated blade members provided with longitudinal external cutting edges insertable in said apertures; interengaging means between said blades and head portion comprising a series of parallel serrations formed upon adjacent rear surfaces of the respective blades and blade apertures, said serrations extending longitudinally of the tool and inclined with respect to the tool axis and with respect to the longitudinal cutting edges of said blades and providing means whereby said blades may be adjusted bodily in a radial direction one or more serrations to effect major changes in reamer diameter; adjusting means carried by said reduced portion adapted to engage the inner ends of said blades and to move same forwardly in said apertures and simultaneously minute distances radially outwardly with respect to the axis of the tool, said adjusting means also serving as abutment means positively preventing inward movement of said blades under the action of the cutting pressures thereon; and clamping means coextensive with the length of said blades for clamping said blades in adjusted position comprising tapered screw means insertable radially in said head portion between said blade apertures for flexing peripheral portions of said head circumferentially firmly into engagement with the opposite sides of said blades.

2. An insertable blade reamer comprising an elongated body member having an enlarged head portion, a tapered driving shank portion and an intermediate threaded portion of smaller diameter than the head portion, said head portion having a plurality of radially disposed peripheral apertures extending longitudinally of said body; a plurality of cutting blades insertable in alternate ones of said peripheral apertures; interengaging means between said blades and the said head portion comprising a series of parallel interfitting serrations formed upon the adjacent rear faces of said blades and blade apertures said serrations extending in the general direction of the axis of said body member but diverging outwardly from the said axis in a forward direction, for guiding said blades longitudinally and normally positively locking said blades against movement radially in said apertures, said serrations also providing means whereby said blades may be adjusted radially in the said apertures one or more serrations thereby to effect major adjustments in diameter of the assembled cutting tool; an adjusting nut threaded to said intermediate portion and abutting the inner ends of said blades normally to prevent endwise movement thereof inwardly under working conditions and to provide means for advancing the blades with respect to the body member thereby to effect a micrometer-like adjustment in the diameter of the assembled cutting tool; and means insertable radially in the apertures intervening said blade aperture for flexing the peripheral portions of said head portion substantially coextensive with the length of said blades against the blades thereby to hold the latter elements firmly in adjusted position in said holder.

3. An insertable blade reaming tool combining a cylindrical body member having a head portion and a driving portion, said head portion being provided with a plurality of radially disposed slots extending longitudinally thereof and dividing said head portion into a plurality of sector-shaped sections; a series of parallel serrations formed upon one of the radial walls of alternate ones of said slots, said serrations being inclined with respect to the axis of said tool; a plurality of blade elements having external longitudinally extending cutting edges insertable in said alternate slots and having serrations formed upon one face thereof adapted to interfit with the serrations formed therein upon the body member, the serrations upon said blades extending longitudinally thereof and inclined with respect to their longitudinal cutting edges; means comprising an adjusting nut and a jam nut for advancing all of said blades simultaneously longitudinally and radially in said head portion, the said series of serrations being so constructed and arranged as to maintain the peripheral longitudinal cutting edges of said blades parallel with the axis of the tool during said advancing movement; and tapered screw means insertable radially in the slots intervening the said alternate slots for flexing said sector-shaped portions of said head circumferentially thereby to clamp substantially the whole of said blades in the alternate slots firmly in adjusted position.

4. An inserted blade reamer combining an elongated body member having an enlarged head portion, a driving portion and an intermediate threaded portion, said head portion having a plurality of radially disposed peripheral apertures extending longitudinally of said body; a plurality of elongated cutting blades insertable in alternate ones of said peripheral apertures the inner end surfaces of said blades being so formed as to lie in a single plane substantially perpendicular to the axis of the reamer; interengaging means between said blades and the said head portion comprising a series of parallel interfitting serrations formed upon the adjacent rear faces of said blades and blade apertures extending in the general direction of the axis of said body member but inclined with respect thereto and with respect to said cutting edges for guiding said blades longitudinally and normally to positively lock said blades against movement radially in said apertures, said serrations also affording means for adjusting said blades bodily radially in the said apertures thereby to effect major adjustments in diameter of the assembled reamer; an adjusting nut threaded to said intermediate portion and abutting the said inner end surfaces of said blades normally to prevent axial movement thereof rearwardly under working conditions and for advancing the blades with respect to the body member thereby to effect micrometer-like adjustments in the diameter of the assembled reamer; and means acting in a radial direction for impinging peripheral portions of said head portion substantially coextensive with the length of said blades against the blades thereby to hold the latter firmly in adjusted position in said head.

OLE SEVERSON.